R. Little,
Nose Ring,
No. 31,610. Patented Mar. 5, 1861.
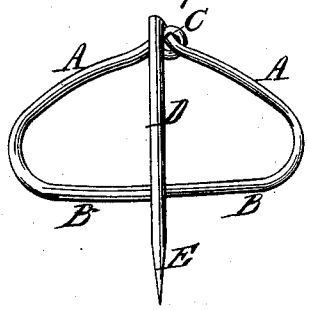
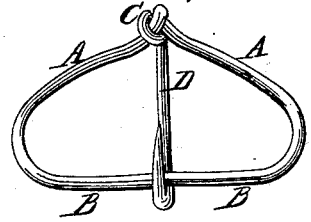
Witnesses:
Inventor:

UNITED STATES PATENT OFFICE.

R. LITTLE, OF MIDDLE BRANCH, OHIO.

DEVICE TO PREVENT HOGS FROM ROOTING.

Specification of Letters Patent No. 31,610, dated March 5, 1861.

*To all whom it may concern:*

Be it known that I, R. LITTLE, of Middle Branch, in the county of Stark and State of Ohio, have invented a new and Improved Article of Manufacture to be Used to Prevent Hogs from Rooting; and I do hereby declare that the following is a full, clear, and exact description of the same, reference being had to the accompanying drawings, which form a part of this specification.

In the drawings Figure 1 represents a rear view of the device complete and ready to be applied to the end of the hog's snout. Fig. 2 represents a front view of the device with the end D bent up, as it appears after it is applied to use, and Fig. 3 represents a side view of the device after it has been thus applied—the end of the hog's snout being represented in red lines.

To construct my device, I take a roll of wire and cut it up into pieces of the requisite length and then sharpen one end as seen at E, while the other end is bent so as to form an eye as seen at C. The piece of wire is then bent so as to have the appearance shown in Fig. 1, where B, B, represents the lower and A, A, the upper parts, while the pointed end of the wire is passed through the eye C, and then bent down so as to project below the lower part B B, as shown in the drawings.

To apply the device to use, the sharp end E, is first passed through the upper lower end of the hog's snout when the end D of the wire, is drawn through so as to bring the device into the position as indicated in Fig. 3, after which the sharp point E is bent up over the part B, as indicated in Figs. 2 and 3. The hog cannot now root without subjecting itself to so much pain and inconvenience as to render all such efforts perfectly harmless.

The device is simple, can be quickly applied, and is not liable to get out of order. It is formed from a single piece of wire, and consequently can be constructed at a small expense.

Having described my invention, what I claim and desire to secure by Letters Patent, as an improved article of manufacture, is—

A device for preventing hogs from rooting formed from a single piece of wire in the manner above described and as fully shown in Fig. 1 of the accompanying drawings.

In witness whereof I have hereunto subscribed my name.

R. LITTLE.

In presence of—
  G. W. HUMBERT,
  SAMUEL LITTLE.